(12) United States Patent
Hutter, III

(10) Patent No.: US 7,614,602 B2
(45) Date of Patent: Nov. 10, 2009

(54) STANDOFF ATTACHMENT WITH INTERNAL NUT

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 93 days.

(21) Appl. No.: 11/463,331

(22) Filed: Aug. 9, 2006

(65) Prior Publication Data

US 2007/0059994 A1   Mar. 15, 2007

Related U.S. Application Data

(60) Provisional application No. 60/716,879, filed on Sep. 13, 2005.

(51) Int. Cl.
*F16B 39/00* (2006.01)
*F16B 43/00* (2006.01)
*A47G 29/00* (2006.01)

(52) U.S. Cl. .................. 248/694; 411/105; 411/533

(58) Field of Classification Search .............. 248/694, 248/127, 154, 188.1, 519, 523; 411/82.1, 411/116, 533, 338, 368, 432, 544, 546, 999, 411/156, 105

See application file for complete search history.

(56) References Cited

U.S. PATENT DOCUMENTS

| 2,737,222 | A | * | 3/1956 | Becker | 411/105 |
| 3,504,723 | A | * | 4/1970 | Cushman et al. | 411/82.1 |
| 4,668,546 | A | | 5/1987 | Hutter, III | |
| 5,779,288 | A | * | 7/1998 | Amelio | 292/251 |
| 6,899,503 | B2 | * | 5/2005 | Anderson et al. | 411/533 |
| 6,908,276 | B2 | * | 6/2005 | Dohm | 411/533 |

* cited by examiner

*Primary Examiner*—Anita M King
(74) *Attorney, Agent, or Firm*—Kelly Lowry & Kelley, LLP; Stuart O. Lowry

(57) ABSTRACT

A standoff attachment for bonded fixation to a substrate includes a standoff post with internal nut for engaging a mating fastener used to mount a support element such as a line clamp substantially at a distal end thereof. The standoff post extends from an enlarged bond-on base and defines a hollow slotted channel of noncircular cross-section which terminates at the distal end in an in-turned flange defining an open fastener-receiving port. The nut includes a keyed rib sized and shaped for axial slide-fit reception into the slotted channel at an inboard side of the distal end flange, wherein this rib mates with the slotted channel shape to preclude substantial nut rotation. An elongated slotted plug is secured within the slotted channel to retain the nut, preferably with a minor degree of axial freedom, axially between the plug and the distal end flange.

20 Claims, 3 Drawing Sheets

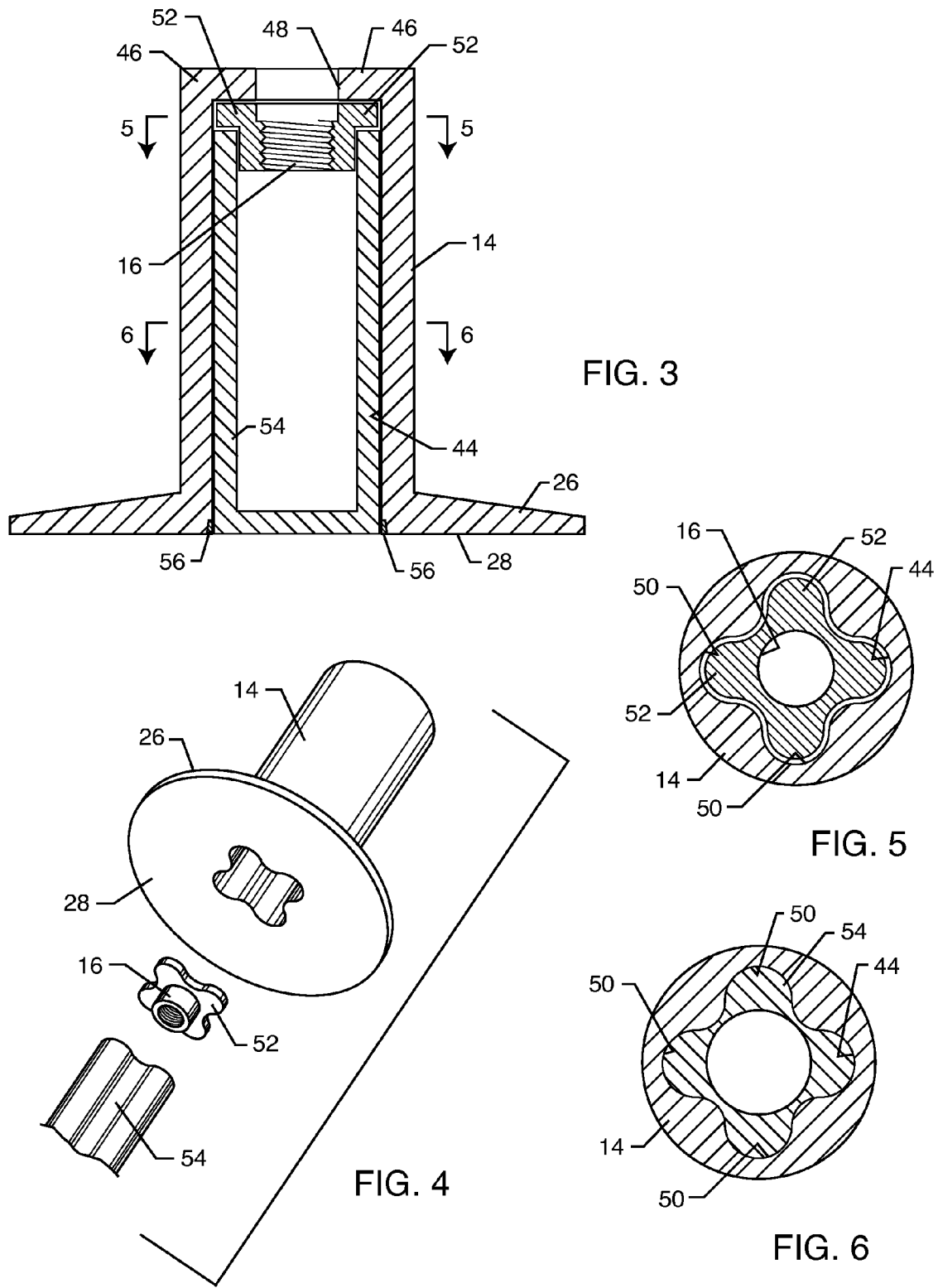

STANDOFF ATTACHMENT WITH INTERNAL NUT

BACKGROUND OF THE INVENTION

This invention relates generally to an improved standoff attachment of the type designed for mounting onto a substrate, for use in supporting hardware items such as conduits or cables and the like with respect to the substrate. More specifically, this invention relates to an improved standoff attachment having an internal floating nut mounted substantially at a distal or free end of an elongated standoff post, wherein the internal nut facilitates subsequent assembly with a threaded fastener such as a bolt or screw.

Standoff attachments are well known for use in a variety of aerospace, marine and automotive applications for supporting items such as electrical, pneumatic and/or hydraulic service lines and the like on a substrate. A typical standoff attachment comprises a base structure adapted for secure mounting onto the substrate, in combination with an elongated standoff post projecting outwardly a short distance from the base structure. The standoff post carries a threaded nut adapted for thread-in engagement with a mating fastener such as a suitable bolt or screw used for mounting and supporting the item, such as an electrical wiring bundle or the like, generally at a distal or free end of the standoff post. In one preferred configuration particularly suited for use with thin-walled and/or composite material substrates, the base structure of the standoff attachment is adapted for adhesive bonded mounting onto the substrate thereby avoiding the need to form one or more holes in the substrate. See, for example, U.S. Pat. No. 4,668,546, and adhesive bonded standoff attachments available from Click Bond, Inc. of Carson City, Nev. under product part numbers CB3001, CB3004, CB4001 and CB 4002.

In the past, the threaded standoff nut has been tightly locked or anchored in position on or within the standoff post, as by co-molding the threaded nut within a standoff post formed from a thermoplastic or other moldable material. Such rigid nut installation undesirably increases the risk of cross-threaded engagement by the associated bolt or screw, particularly in view of the fact that the bolt or screw is commonly installed by means of a power tool. Unfortunately, a cross-threaded coupling can be difficult to disassemble, and, upon disassembly, difficult or impossible to re-assemble without replacing the threaded standoff nut. In this regard, nut cross-threading can be a major problem when one or more standoff couplings are disassembled to permit separation of a wiring grid or network or the like from the substrate in the course of routine and/or scheduled maintenance procedures, followed by re-assembly of the standoff coupling components.

By contrast, quick and easy, cost-efficient mounting of the standoff nut in a floating manner at the distal end of the standoff post, to accommodate a minor degree of axial and rotational movement relative to the standoff post, substantially without risk of the standoff nut separating from the standoff post, has not been achieved.

The present invention relates to an improved standoff attachment, particularly of the type adapted for adhesive bonded mounting onto a selected substrate, and including an internal threaded nut for subsequent assembly with an associated bolt or screw, wherein the threaded nut is captured and retained substantially at a distal end of the standoff post and in a floating manner, i.e., in a manner accommodating a minor degree of axial and rotational displacement.

SUMMARY OF THE INVENTION

In accordance with the invention, an improved standoff attachment is provided for secure, preferably bonded fixation to a selected substrate, and includes an elongated standoff post having a floating internal nut carried generally at a distal or free end thereof. The floating internal nut is adapted to receive and engage a mating fastener used to mount a support element such as a line clamp or the like substantially at the distal end of the stand-off post. The floating internal nut accommodates a minor degree of axial and rotational displacement relative to the standoff post, thereby facilitating proper threaded engagement with the mating fastener particularly by means of a power tool, with minimal risk of improper cross-threading.

In the preferred form, the standoff post comprises a generally tubular structure projecting from an enlarged base having a size and shape for secure bond-on attachment to the substrate. The tubular standoff post defines an internal hollow slotted channel of noncircular cross-section which extends from a proximal end of the post at the base, and terminates at the post distal end in a radially in-turned flange defining a comparatively smaller cross-section fastener-receiving port. The internal nut includes a peripheral rib sized and shaped for axial slide-fit reception into the slotted channel at an inboard side of the distal end flange, wherein this rib mates with the slotted channel shape to accommodate a minor degree of nut rotation while precluding substantial nut rotation. An elongated slotted plug is secured within the slotted channel at an inboard side of the nut and functions to retain the nut preferably with a minor degree of axial freedom at a position interposed axially between the plug and the distal end flange.

In use, the standoff attachment is adapted for quick, easy, and secure adhesive bonded fixation onto a selected substrate as by means of a fixture of the general type disclosed in U.S. Pat. No. 4,668,546 which is incorporated by reference herein. Such fixture generally comprises an outer frame having a connector flange carrying a pressure sensitive adhesive or the like for temporary adherence to the substrate, an inner frame carrying the standoff attachment, and a plurality of spring tabs or spokes extending between the inner and outer frames. With the standoff attachment supported by the inner frame, a selected curable bonding agent is applied to the underside of the attachment base, followed by pressed and seated adherence of the outer frame connector flange against the substrate. In this position, the inner frame is displaced toward the substrate to press the attachment base against the substrate, and to shift the spring tabs over-center for applying a positive force retaining the attachment base firmly against the substrate for the duration of a bonding agent cure time. After the bonding agent has cured, the fixture can be stripped from the standoff attachment.

Thereafter, a mating fastener such as a bolt or screw can be threadably engaged with the floating nut at the distal end of the standoff post, for purposes of mounting one or more selected support elements thereto. In one preferred form, the support element comprises a clamp such as a P-type clamp used for supporting elongated conductive cables or wiring bundles or the like.

Other features and advantages of the present invention will become apparent from the following more detailed description, taken in connection with the accompanying drawing which illustrate, by way of example, the principals of the present invention.

BRIEF DESCRIPTION OF THE DRAWINGS

The accompanying drawings illustrate the invention. In such drawings:

FIG. 3 is an enlarged vertical sectional view of the standoff attachment, taken generally on the line 3-3 of FIG. 2;

FIG. 4 is an exploded and partially fragmented perspective view of the standoff attachment of FIG. 3;

FIG. 5 is an enlarged horizontal vertical section taken generally on the line 5-5 of FIG. 3;

FIG. 6 is an enlarged horizontal vertical section taken generally on the line 6-6 of FIG. 3.

DETAILED DESCRIPTION OF THE PREFERRED EMBODIMENT

Figure 1:
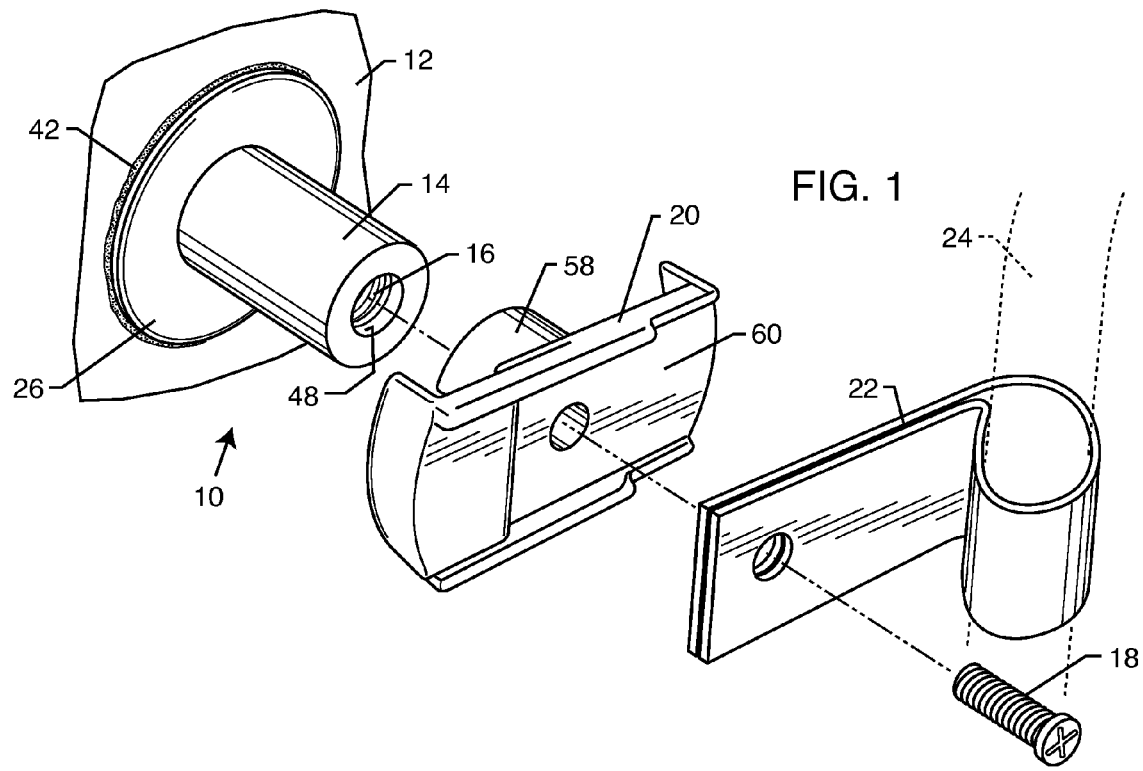
FIG. 1 is a perspective view of a standoff attachment constructed in accordance with the invention and shown mounted onto a supporting substrate, and depicted in exploded relation with a threaded fastener for securing an illustrative line clamp support bracket and related line clamp thereto.

As shown in the exemplary drawings, a standoff attachment referred to generally in FIG. 1 by the reference numeral 10 is provided for mounting onto a selected substrate 12. The standoff attachment includes an elongated standoff post 14 having an internal threaded nut 16 mounted generally at a distal or free end thereof, and in a floating manner to accommodate a minor degree of axial and/or rotational displacement.

The improved standoff attachment 10 of the present invention is particularly designed for use in a variety of aerospace, marine and automotive applications for supporting items such as electrical, pneumatic and/or hydraulic service lines and the like on a substrate, such as a supporting panel or hull or other frame component. In the preferred form, the standoff attachment 10 is adapted for secure and stable adhesive bonded fixation onto the substrate 12, without requiring formation of any mounting hole or holes in the substrate. Accordingly, the standoff attachment is particularly suitable for use with thin-walled and/or non-metal or composite material substrates.

Figure 7:
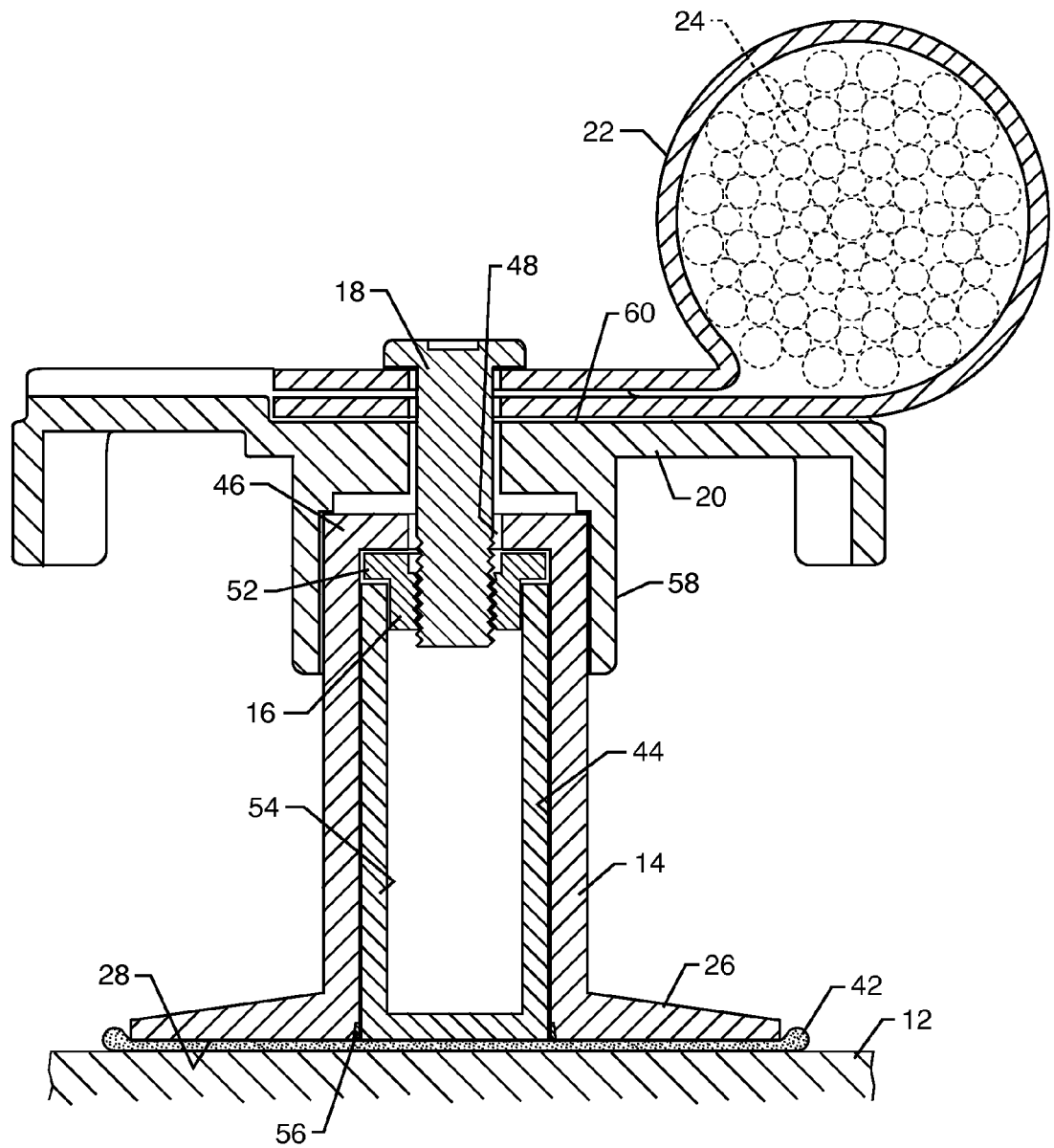
FIG. 7 is an enlarged vertical sectional view showing the standoff attachment mounted onto the substrate, and further depicting the threaded fastener, line clamp support bracket and related line clamp assembled therewith.

In general terms, the floating nut 16 on the standoff post 14 is adapted for threaded reception of and engagement with a mating fastener 18, such as an appropriately sized bolt or screw used for mounting one or more support elements substantially at the distal end of the standoff post 14. FIGS. 1 and 7 shown illustrative support elements in the form of a line clamp support bracket 20 for providing a stable foundation to support a P-type line clamp 22 or the like which is used in turn for carrying an elongated structure such as one or more conductive cables or a wiring bundle 24 or the like relative to the substrate. Persons skilled in the art will recognize and appreciate that the threadably engaged nut 16 and fastener 18 may be used for securing any of a wide variety of different support elements at the distal end of the standoff post 14.

In accordance with a primary aspect of the invention, the floating nut 16 is quickly, easily, and properly engaged by the mating fastener 18, substantially without risk of an improper cross-threaded engagement and/or associated jamming of the threaded coupling and/or undesirable stripping of the internal threads within the nut 16. Such proper engagement between these components 16, 18 is facilitated despite conventional use of a power tool (not shown) for threadably engaging the fastener 18 with the nut 16. The floating nut 16 accommodates minor albeit sufficient axial and/or rotational displacement relative to the standoff post 14 to achieve the desired proper threaded engagement with the fastener 18. However, significant axial and/or rotational nut displacement relative to the post 14 is substantially prevented.

As shown in the illustrative drawings in accordance with one preferred form of the invention, the improved standoff attachment 10 generally comprises an enlarged base 26 carrying the standoff post 14. These components are constructed from a relatively stiff and rigid or sturdy material suitable for affixation to the substrate 12 at a selected point thereon. In this regard, in a preferred form, the attachment base 26 and associated post 14 are constructed from a selected thermoplastic material such as polyetheretherketone (PEEK), polyetherimide (PEI), or polyetherketoneketone (PEKK), suitable for adhesive bonded mounting onto the substrate 12. The illustrative drawings show the base 26 having a circular or disk-shaped configuration defining a relatively large underside surface 28 for adhesive bonded attachment to the substrate 12.

Figure 2:
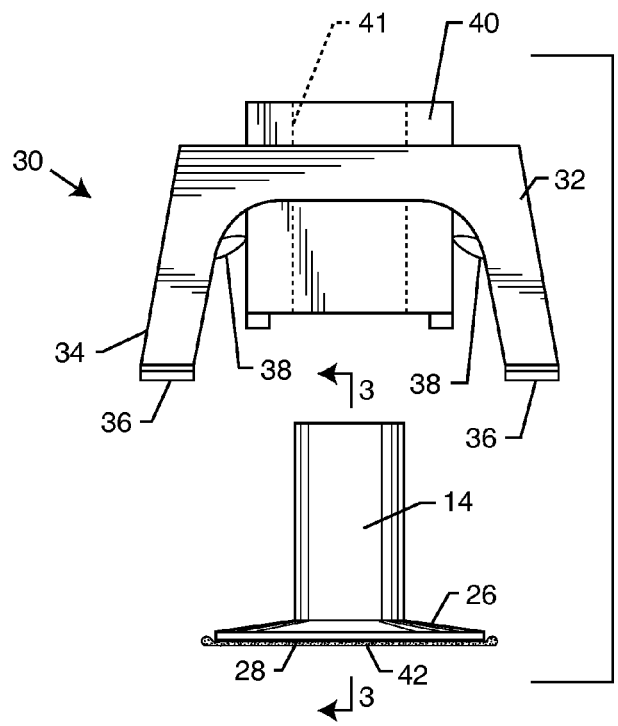
FIG. 2 is an enlarged front elevation view of the standoff attachment in exploded relation with an exemplary mounting fixture.

More particularly, as viewed in FIG. 2, a disposable fixture 30 may be provided for use in secure adhesive bonded mounting of the standoff attachment 10 to the substrate 12. The disposable fixture 30 generally conforms with the fixture shown and described in U.S. Pat. No. 4,668,546 which is incorporated by reference herein. Specifically, the disposable fixture 30 comprises an outer frame 32 having one or more connector flanges 34 each carrying a pressure sensitive adhesive 36 or the like for temporary adherence to the substrate. The outer frame 32, which may be constructed from a lightweight molded plastic material, is joined by a plurality of inwardly radiating spring tabs or spokes 38 to an inner frame 40 carrying the standoff attachment 10 as by press-fit engagement of the standoff post 14 into a central bore 41 formed in the inner frame 40 with the enlarged base 26 bearing against a lower end of the inner frame. In an initial position as viewed in FIG. 2, the spring tabs 38 extend radially inwardly and axially from the outer frame 32 to support the inner frame 40 in a position spaced or retracted a short distance above the plane of the pressure sensitive adhesive 36 on the connector flanges 34.

A selected curable bonding agent 42 (FIGS. 1 and 2) is applied to the underside of the standoff attachment base 26, followed by pressed and seated adherence of the outer frame connector flanges 34 against the substrate 12. The pressure sensitive adhesive 36 retains the fixture 30 in place on the substrate. The inner frame 40 is then displaced toward the substrate 12 to press the attachment base 26 against the substrate, thereby firmly pressing the bonding agent 42 on the base 26 against the substrate. This displacement is accompanied by shifting of the spring tabs 38 over-center thereby applying a positive force urging and retaining the attachment base 26 firmly against the substrate 12 for the duration of a bonding agent cure time. After the bonding agent 42 has cured, the fixture 30 can be stripped from the standoff attachment 10, to leave the attachment 10 on the substrate (as viewed in FIG. 1).

The thus-mounted standoff attachment is oriented with the standoff post 14 protruding a short distance from the substrate 12. As shown best in FIGS. 3-7, this post 14 has a generally tubular and hollow configuration incorporating a slotted internal channel 44 extending from an inboard or proximal end thereof at the base 26, and terminating at the distal or free end of the post whereat a radially in-turned flange 46 (FIG. 3) defines an open fastener-receiving port 48 of comparatively smaller cross sectional size. As shown (FIGS. 5-6), a preferred configuration for the slotted channel 44 comprises a generally circular bore lined by a plurality of longitudinally extending and radially enlarged elongated grooves 50, with the exemplary cross sectional drawings showing four grooves 50 formed at equi-angular intervals. By contrast, the fastener-receiving port 48 has a circular shape and a diametric size smaller than a diametric size defined by the grooves 50.

The internal nut 16 is slide-fitted into the slotted internal channel 44 of the standoff post 14, to a position disposed substantially at an inboard side of the in-turned flange 46 at the post distal end. The preferred nut geometry comprises an internally threaded, generally cylindrical body component joined at an axially upper margin with a keyed rib 52 defining a plurality of radially outwardly projecting keys sized for respective slide-fit reception into the enlarged grooves 50 defining the slotted channel 44. The individual ribs are sized to accommodate a minor degree of rotational freedom for the nut 16 relative to the slotted channel 44 in the standoff post 14, but otherwise prevent substantial nut rotation relative to the post.

A slotted plug 54 has an elongated shape defining a non-circular cross section sized for slide-fit reception into the slotted channel 44, subsequent to slide-fit installation of the nut 16. In this regard, the cross sectional shape of the plug 54 matingly or substantially matingly conforms with the shape of the slotted channel 44, whereby the plug 54 effectively supports and retains keyed rib 52 on the nut 16 substantially at the distal end of the standoff post 14, preferably with a minor degree of axial freedom movement between an upper end of the plug 54 and an inboard face of the post flange 46. As shown, the body component of the nut 16 is sized for slide-fit reception into an otherwise open upper end of the plug 54.

In addition, as shown, the plug 54 has a lower end terminating substantially at the plane of the underside surface 28 on the base 26. In the preferred form, the plug 54 is secured in place as by an ultrasonic weld 56 or the like. Persons skilled in the art will appreciate, however, that alternative securement methods may be used, including but not limited to adhesive materials and press-fitted engagement of the components.

With the standoff attachment 10 mounted onto the substrate 12, the mating fastener 18 such as a bolt or screw can be threadably engaged with the floating nut 16 at the distal end of the standoff post 14, for purposes of mounting one or more selected support elements thereto. In one preferred form as shown (FIGS. 1 and 7), the support element or elements may comprise the line clamp support bracket 20 defining an underside boss 58 for seated engagement onto the distal end of the standoff post 14, and an upper platform 60 for seated support of one or more additional support elements such as the illustrative P-type line clamp 22 used for supporting and retaining elongated structures such as the exemplary wiring bundle 24 or the like. Importantly, the floating nature of the nut mount at the distal end of the standoff post 14 accommodates rapid and accurate threaded coupling between the fastener 18 and nut 16, with minimal risk of undesired cross-threading, despite use of a power tool for component assembly. In addition, the floating nature of the nut mount further accommodates a variety a nut thread embodiments including split and/or out-of-round so-called lock nut configurations. Moreover, upon tight threaded engagement of the fastener 18 with the nut 16, the in-turned flange 46 at the distal end of the standoff post 14 effectively prevents the nut 16 from being axially separated from the standoff post 14.

In a typical installation, multiple standoff attachments 10 are mounted onto the substrate 12 and cooperatively support wiring bundles 24 or the like that collectively define a complex wiring harness or grid carried by the substrate. The fasteners 18 associated with a selected plurality of standoff attachments 10 can be disassembled to accommodate and facilitate separation of the wiring harness from a localized region of the substrate in the course of a required maintenance and/or repair procedure. When the maintenance activity is completed, the individual fasteners 18 can be re-engaged with their respective standoff attachments 10 with minimal risk of undesired component cross-threading.

Although various embodiments and alternatives have been described in detail for purposes of illustration, various further modifications may be made without departing from the scope and spirit of the invention. Accordingly, no limitation on the invention is intended by way of the foregoing description and accompanying drawings, except as set forth in the appended claims.

What is claimed is:

1. A standoff attachment for fixation to a substrate, comprising:
   a standoff post having a proximal end adapted for fixation relative to said substrate, and a distal end;
   said post having a hollow construction defining an internal channel of noncircular cross section;
   a nut floatingly received within said channel;
   means for mounting said nut generally at said post distal end, said mounting means permitting limited floating movement of said nut relative to said post; and
   further including a radially in-turned flange carried by said post substantially at said distal end thereof, said flange having a port formed therein for receiving a fastener therethrough into engagement with said nut.

2. The standoff attachment of claim 1 wherein said mounting means permits limited axial floating movement of said nut relative to said post.

3. The standoff attachment of claim 2 wherein said mounting means further permits limited rotational floating movement of said nut relative to said post.

4. The standoff attachment of claim 1 wherein said mounting means permits limited rotational floating movement of said nut relative to said post.

5. The standoff attachment of claim 1 wherein said channel comprises a slotted channel.

6. The standoff attachment of claim 1 wherein said nut further includes a keyed rib having a size and shape for slide-fit reception into said channel.

7. The standoff attachment of claim 1 further including a plug fitted into said channel for retaining said nut axially between said plug and said flange.

8. The standoff attachment of claim 7 wherein said plug has a noncircular cross section for substantially mated slide-fit reception into said channel.

9. The standoff attachment of claim 1 further including an enlarged base carried by said post substantially at said proximal end thereof for fixation to said substrate.

10. The standoff attachment of claim 1 wherein said standoff post is formed from a thermoplastic material.

11. The standoff attachment of claim 1 wherein said proximal end of said standoff post is adapted for adhesive bond-on fixation to said substrate.

12. A standoff attachment for fixation to a substrate, comprising:
- a standoff post having a proximal end and a distal end, and defining an internal channel of noncircular cross section extending substantially therebetween;
- an enlarged base carried by said post substantially at said proximal end thereof for fixation to said substrate;
- a radially in-turned flange carried by said post substantially at said distal end thereof, said flange having a port formed therein;
- a nut slidably fitted into said channel and including a keyed rib engageable therewith for preventing full-circle rotation of said nut within said post; and
- a plug fitted into said channel for retaining said nut within said channel in a position axially between said plug and said flange;
- said post distal end being adapted to receive a fastener extending through said port into engagement with said nut.

13. The standoff attachment of claim 12 wherein said plug cooperates with said flange for retaining said nut axially therebetween with limited axial floating movement.

14. The standoff attachment of claim 13 wherein said keyed rib on said nut cooperates with said channel to permit limited rotational movement floating movement of said nut relative to said post.

15. The standoff attachment of claim 12 wherein said keyed rib on said nut cooperates with said channel to permit limited rotational movement floating movement of said nut relative to said post.

16. The standoff attachment of claim 12 wherein said plug has a noncircular cross section for substantially mated slide-fit reception into said channel.

17. The standoff attachment of claim 12 wherein said base is adapted for adhesive bond-on fixation to said substrate.

18. The standoff attachment of claim 12 wherein said post, base and flange are integrally formed.

19. The standoff attachment of claim 12 wherein said channel comprises a slotted channel.

20. A standoff attachment for fixation to a substrate, comprising:
- a standoff post having a proximal end and a distal end, and defining a slotted internal channel of noncircular cross section extending substantially therebetween;
- an enlarged base carried by said post substantially at said proximal end thereof for fixation to said substrate;
- a radially in-turned flange carried by said post substantially at said distal end thereof, said flange having a port formed therein;
- a nut slidably fitted into said slotted channel and including a keyed rib engageable therewith for preventing full-circle rotation of said nut within said post; and
- a plug fitted into said channel for retaining said nut within said channel in a position axially between said plug and said flange;
- said post distal end being adapted to receive a fastener extending through said port into engagement with said nut.

* * * * *